United States Patent [19]

Vernon

[11] 4,293,511

[45] Oct. 6, 1981

[54] PROCESSES AND PRODUCTION APPARATUS FOR RIGID CELLULAR MATERIALS COMPRISING POLYVINYL CHLORIDE

[75] Inventor: Michel Vernon, Trilport, France

[73] Assignee: K.R.P. Plastiques, Trilport, France

[21] Appl. No.: 195,760

[22] Filed: Oct. 10, 1980

Related U.S. Application Data

[63] Continuation-in-part of Ser. No. 958,026, Nov. 6, 1978, abandoned.

[30] Foreign Application Priority Data

Nov. 9, 1977 [FR] France .............................. 77 33693

[51] Int. Cl.³ .............................................. B29D 27/00
[52] U.S. Cl. ........................................ 264/55; 249/82; 249/126; 264/54; 264/DIG. 3; 425/817 R
[58] Field of Search ............ 264/55, 54, 46.5, DIG. 3; 249/82, 126; 425/817 R

[56] References Cited

U.S. PATENT DOCUMENTS

| | | |
|---|---|---|
| 2,374,233 | 4/1945 | Pfleumer ........................ 264/54 X |
| 2,576,749 | 11/1951 | Carpentier ........................ 264/55 |
| 2,589,537 | 3/1952 | Carpentier . |
| 2,590,156 | 3/1952 | Carpentier ........................ 264/55 X |
| 3,003,192 | 10/1961 | Pfleumer ............................ 264/55 |
| 3,161,911 | 12/1964 | Mathews . |
| 3,283,043 | 11/1966 | Landler et al. .................. 264/54 |
| 3,290,262 | 12/1966 | Leclereq et al. . |
| 3,311,948 | 4/1967 | Axelsonn . |
| 4,079,107 | 3/1978 | Brunner et al. . |

FOREIGN PATENT DOCUMENTS

| | | |
|---|---|---|
| 946719 | of 0000 | France . |
| 1266487 | 6/1961 | France . |
| 1074531 | 7/1967 | United Kingdom . |
| 1074571 | 7/1967 | United Kingdom . |
| 1074573 | 7/1967 | United Kingdom . |
| 1549949 | of 0000 | United Kingdom . |

Primary Examiner—Philip Anderson
Attorney, Agent, or Firm—Browdy & Neimark

[57] ABSTRACT

An improved process and apparatus for producing rigid cellular materials comprising polyvinyl chloride, wherein the controlled expansion of embryonic blocks obtained by molding, is carried out in a single expansion box closed throughout the whole duration of the expansion treatment, in several stages including pre-heating, pre-expanding and final expansion to the final dimensions of the block, the expansion box containing the block expanded to its final dimensions being then immersed in a bath of cold water for dimensional stabilization.

The expansion box comprises at least two plates, with a frame attached to the lower face of each plate, to form, in use, a closed expansion box which is provided with a centering and holding mechanism to maintain the embryonic block in place within the expansion box, a device for opening and closing the expansion box being also provided, as well as a mechanism for transferring a plurality of expansion boxes assembled together from one bath to the other in succession.

28 Claims, 14 Drawing Figures

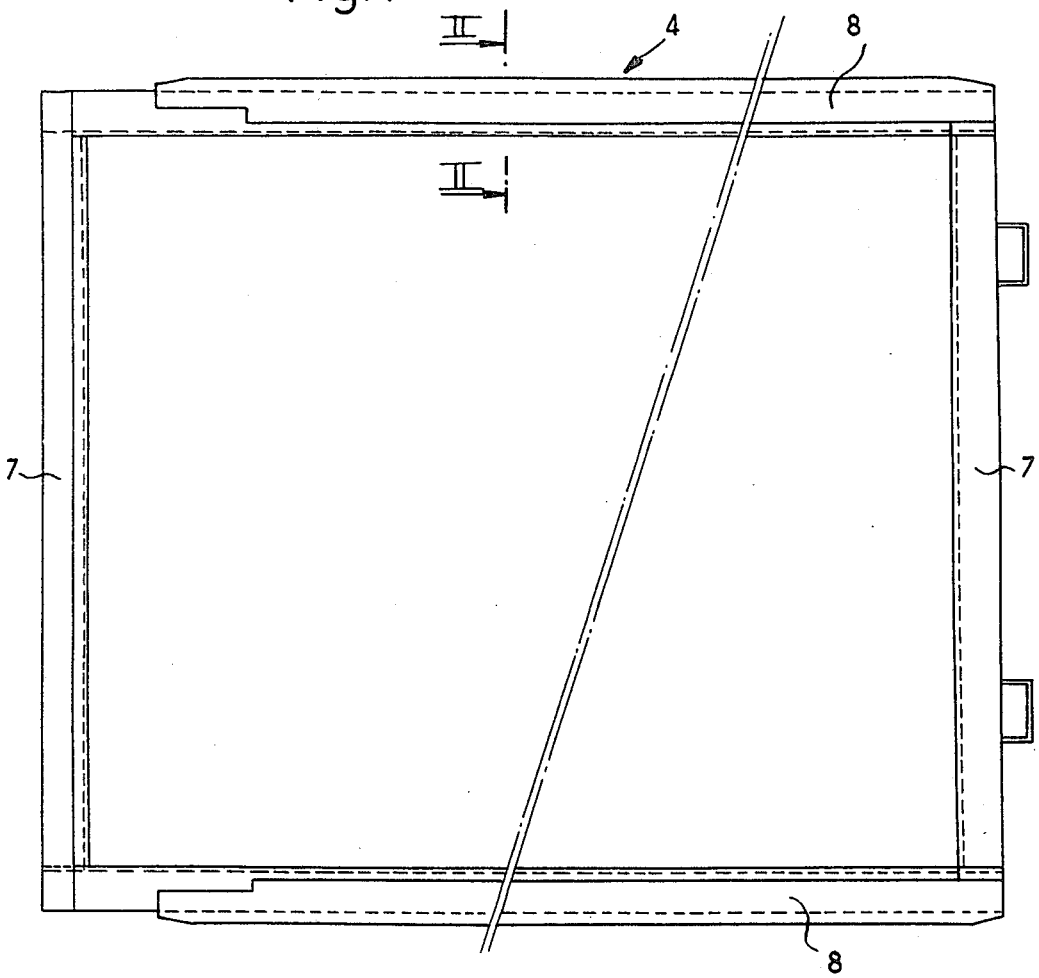
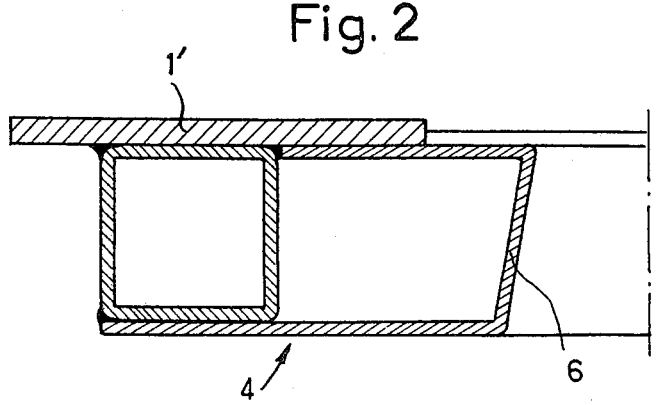

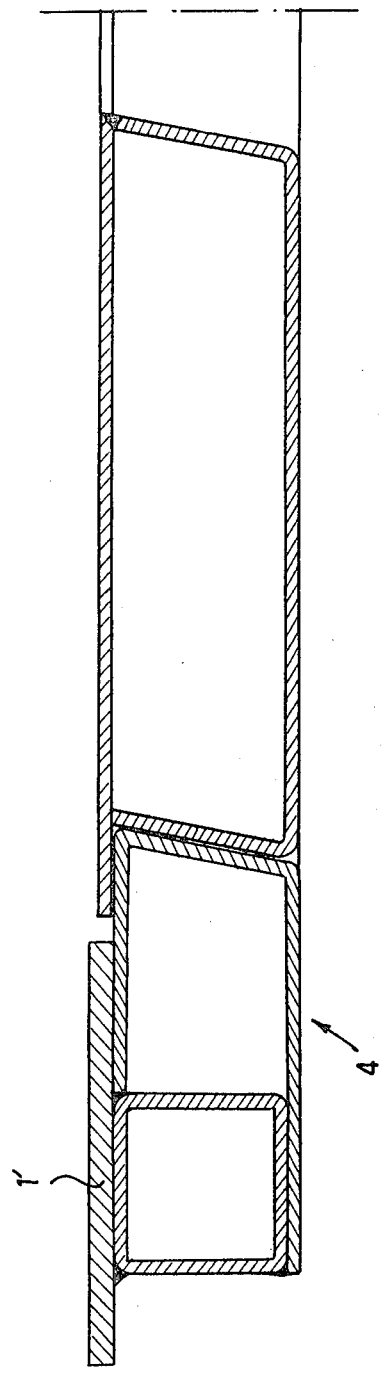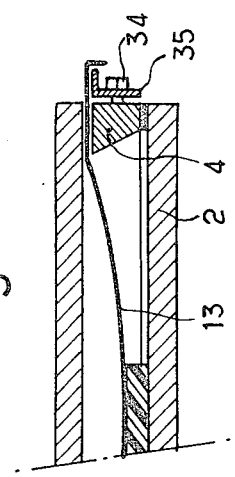

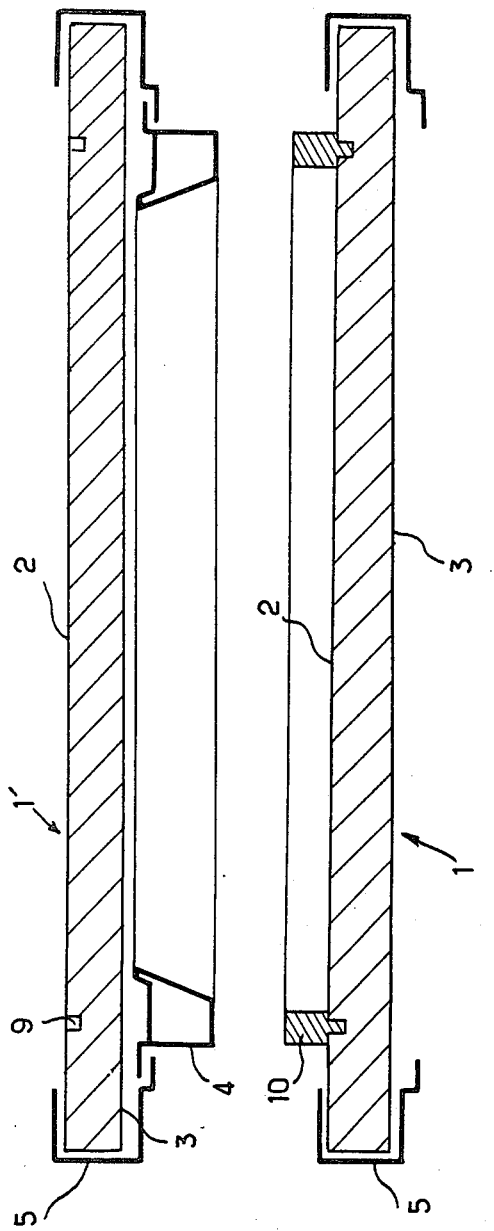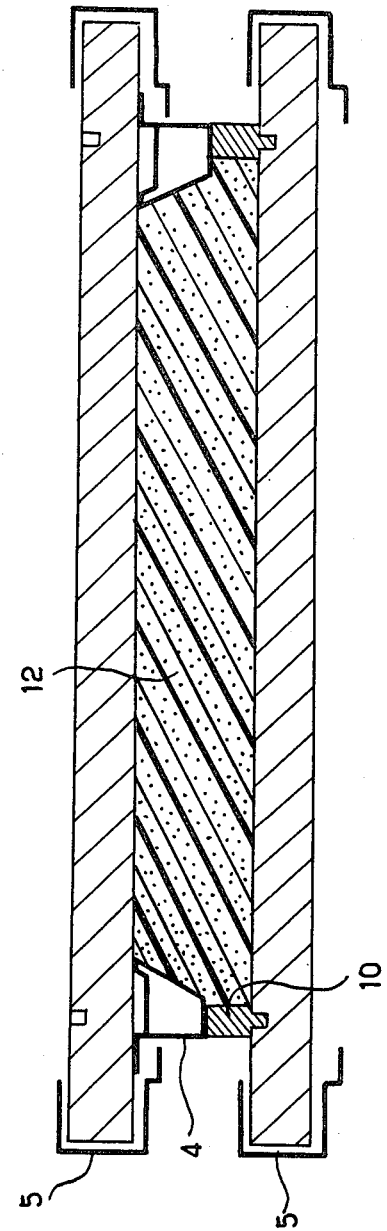

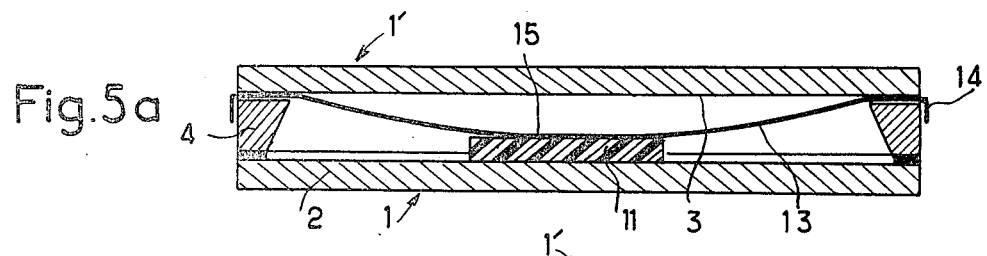
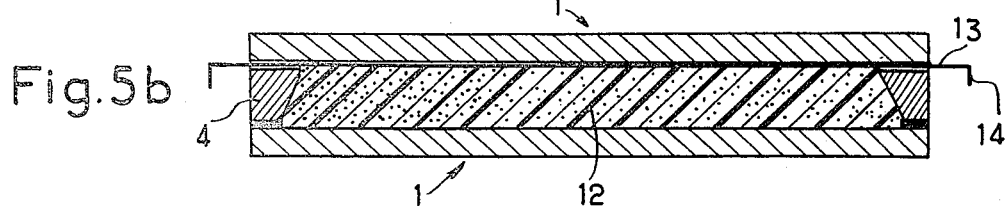
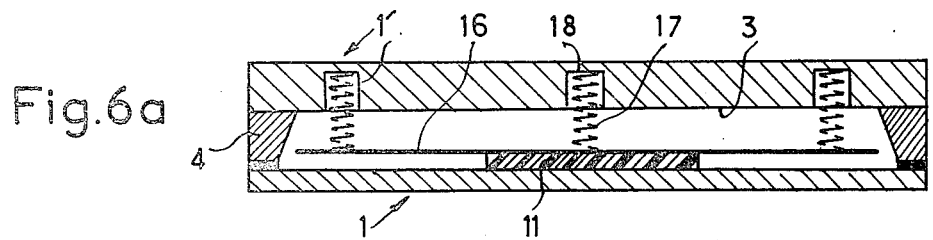
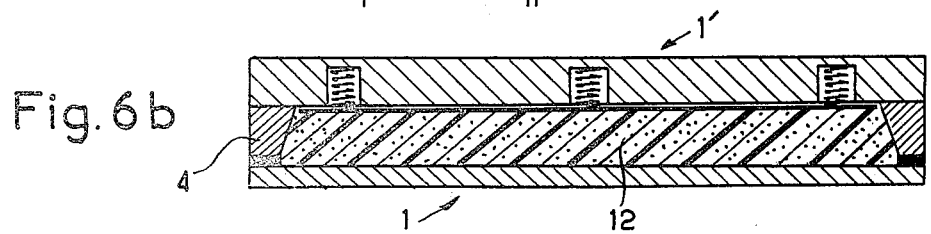
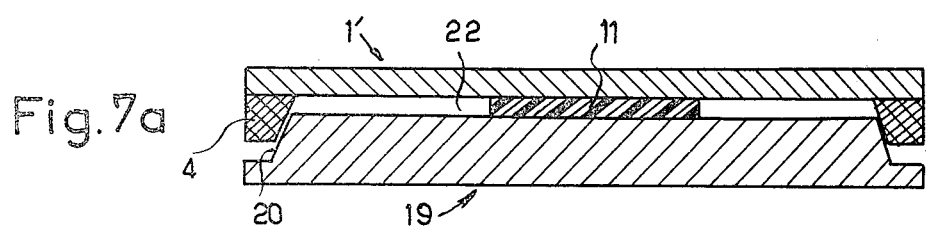
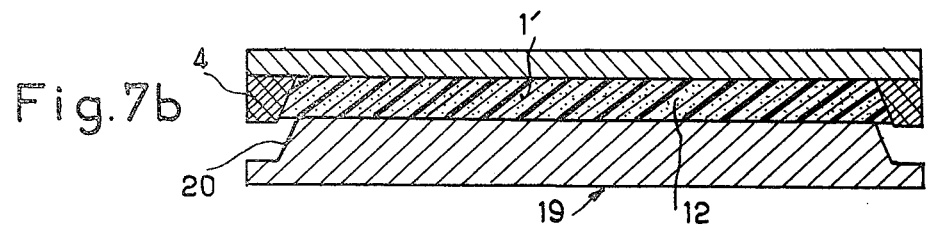

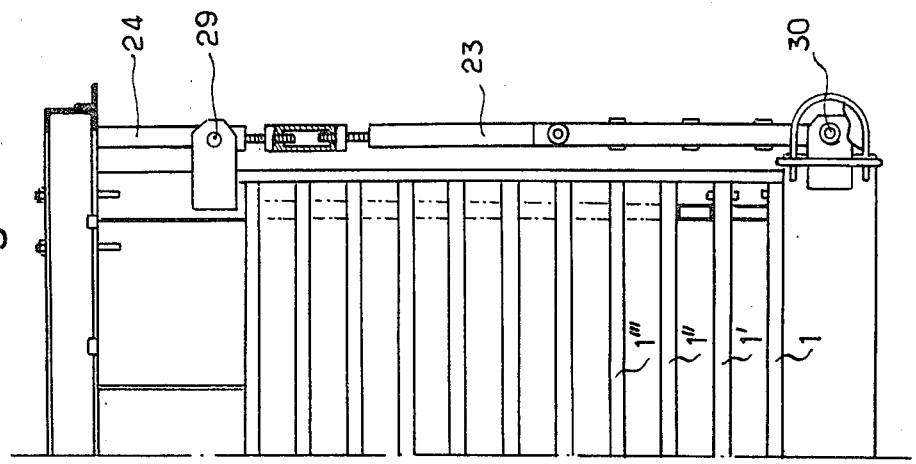
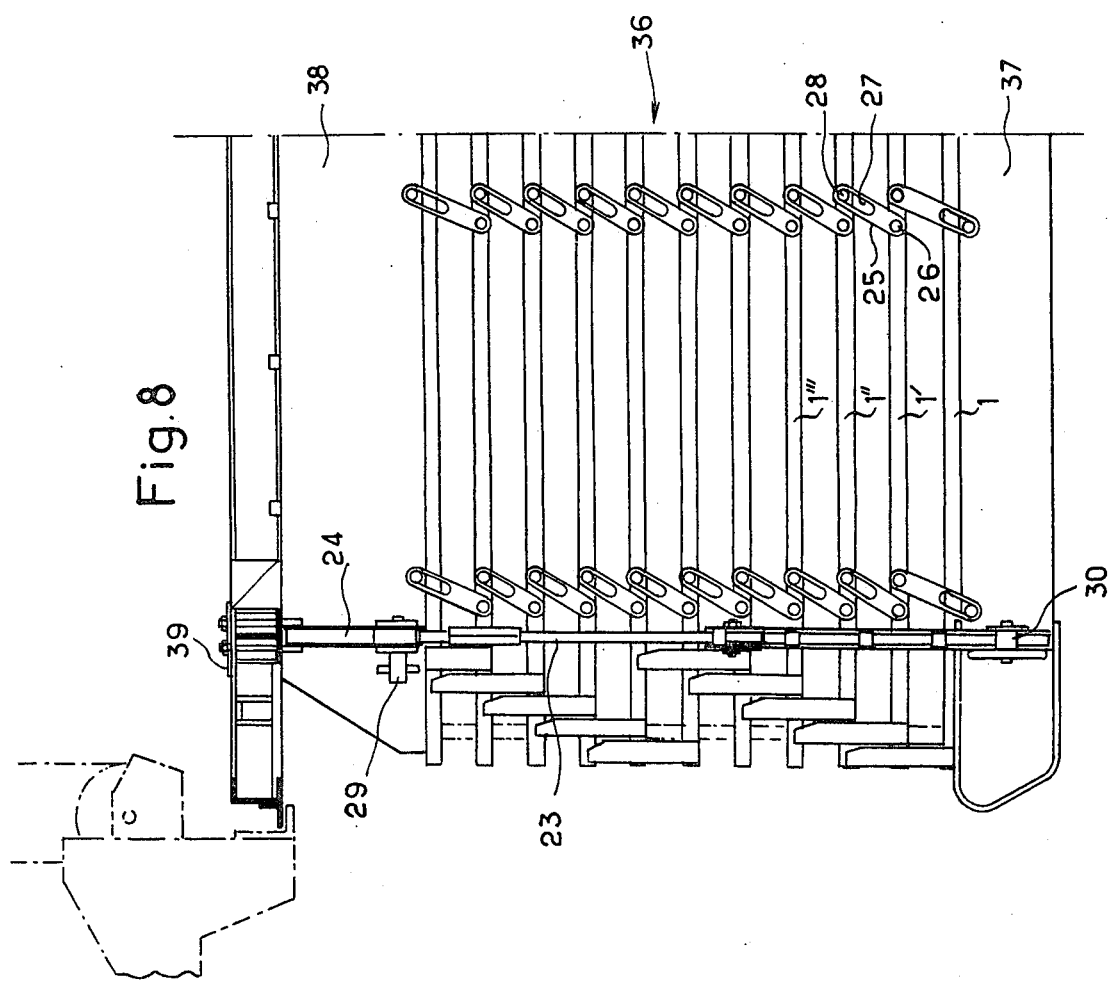

PROCESSES AND PRODUCTION APPARATUS FOR RIGID CELLULAR MATERIALS COMPRISING POLYVINYL CHLORIDE

This is a CIP of copending parent application Ser. No. 958,026, now abandoned, Nov. 6, 1978.

FIELD OF INVENTION

The present invention relates to improvements in the production of rigid cellular materials comprising polyvinyl chloride.

BACKGROUND OF INVENTION

As is known, such a rigid material with closed cells may be obtained from a mixture containing polyvinyl chloride, a polyisocyanate, a suitable foaming agent, a vinylidene monomer and an ethylene anhydride, by molding under pressure and at a high temperature, followed by treating the molded product with hot water or with an atmosphere which is rich in water vapor which reacts with the polyisocyanate, the heat causing the molded product to expand until it attains the final dimensions required, and the product becoming hardened by completion of the water/polyisocyanate reaction.

This known reaction occurs according to the following formulas:

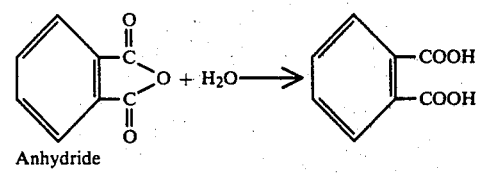
Anhydride

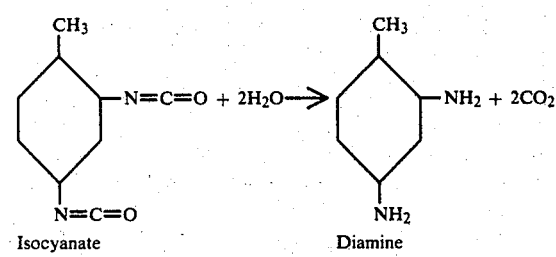
Isocyanate   Diamine

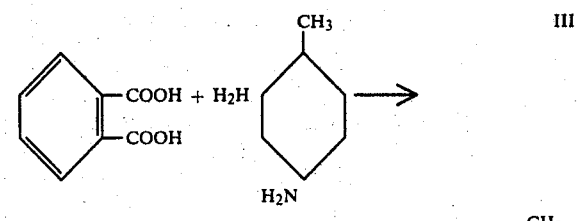

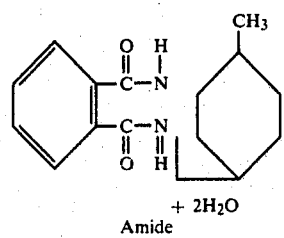
Amide

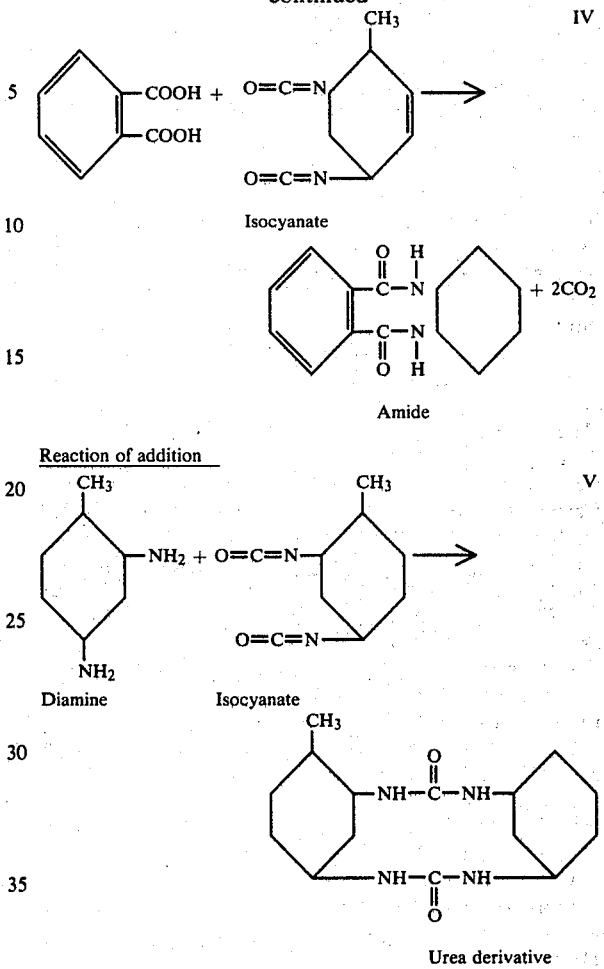

Reaction of addition according to the reaction equation:

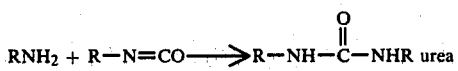

The mixture of the constituents is performed in an appropriate mixer, after which the mixture is introduced in a mold under pressure and at a high temperature of the order of 180° C. During this molding stage there is no swelling (or blowing).

The molded embryo is then withdrawn from the mold under pressure and transferred into an expansion mold where it is submitted to the action of hot water or water vapor.

The blowing takes then place in the presence of hot water (see reactions above) which catalyzes the reaction to produce $CO_2$ which causes expansion within the embryo.

Prior to the manufacture of rigid cellular materials of this type, flexible cellular PVC was prepared in accordance with the Carpentier U.S. Pat. No. 2,590,156 by carrying out a plural step operation which, briefly summarized, involved first forming a preform, termed a "miniature model" and heating the mixture under pressure to initiate gelatinization. Following this, the mass was expanded in an oven in a series of steps, and was finally cooled. The final product produced was soft.

The mold used in the Carpentier process of U.S. Pat. No. 2,590,156 is a so-called "elastic" mold which allows for expansion of the mass enclosed in the mold, the internal volume of the mold changing as the plastic material therewithin expands.

As the molding system of Carpentier 2,590,156 was suitable only for the manufacture of soft cellular PVC, it could not be used in conjunction with the rigid PVC of Carpentier U.S. Pat. No. 2,576,749. In French Pat. No. 946,719 the expansion is essentially carried out in two steps, namely a first step of expansion in the dry atmosphere to carry out the swelling of the mass, followed by a second step of expansion in an atmosphere saturated with water vapor in order to allow a further reaction to take place to increase the rigidity of the cellular body as noted above. The mold used is discussed only briefly, but is similar to that disclosed in Carpentier 2,590,156.

A second step in the evolution of the manufacture of rigid cellular PVC is disclosed in the aforementioned Carpentier U.S. Pat. No. 2,576,749, the French priority application of which was filed on May 9, 1947, the same date as the aforementioned French Pat. No. 946,719, and the French equivalent of which bears the number 946,720. In this patent, the expansion and rigidification are essentially carried out in only one step, which means that the mass to be molded is simultaneously exposed to a heat treatment and to the action of water vapor. Again the mold used is only very briefly described, but is of the same type as is disclosed in the earlier Carpentier patent 2,590,156.

A third step in the evolution of the procedure for the manufacture of rigid cellular PVC is disclosed in U.S. Pat. No. 3,290,262, which patent broadly mentions the concept of expansion in water. This concept is set forth in more detail in U.S. Pat. No. 3,283,043 which discloses a process and the apparatus for expansion in water. However, according to this patent the system permits only free expansion and not controlled expansion in the water. The apparatus shown for manufacturing rigid PVC includes a vat which may contain an expansion bath, suitable means for heating the bath, and means for manufacturing the cellular material immersed during the expansion stage, such maintenance means comprising either a system of grids which receives the material to be expanded and maintains it in immersed position during the expansion treatment, or vertical partitions which maintain the cellular plates to be expanded in the vertical direction during such expansion.

Accordingly, among the prior art processes for the production of rigid cellular PVC with sealed cells, it has been proposed to heat the mixture under suitable pressure in a mold which is gas-tight, and then transfer the resultant embryonic blocks into an apparatus constituted by a plurality of possibly perforated superimposed plates, which are then immersed in vats of hot water for a specific period of time to allow the blocks to expand until they reach final dimensions which correspond substantially to the length and width of each of the plates and the distance therebetween.

However, free expansion in hot water is not satisfactory and the very limited control achieved by the superimposed plates, whether perforated or not, is simply inadequate. When the embryonic blocks are permitted to expand freely in hot water, the final dimensions of the finished blocks are not controlled and the resultant rigid cellular PVC blocks are therefore irregular and erratic. This lack of regularity exists not only within a single block, but in addition the blocks differ from one another. The lack of homogeneity of the blocks expanded according to the free expansion process requires a shaping subsequent to the expansion operation, in order to put all the blocks back to the regular required dimensions; however, even the use of such an additional step does not remedy the irregularities in quality, and more particularly in rigidity, of the blocks.

According to the prior art, attempts have also been made to control the expansion of the processed embryonic blocks by enclosing them in frames closed by a cover and with a perforated metal base, the dimension of these being such that they allow the blocks to expand only in one dimension i.e. in thickness.

It has been demonstrated that the quality and finish of the rigid cellular materials may be greatly improved by carrying out the controlled expansion of the embryonic blocks in several stages, i.e. a pre-heating stage which consists of immersing the embryonic blocks in hot water at $80°-85°$ C. to obtain pre-expansion and homogenization of the temperature inside each of the blocks, then a first controlled expansion stage during which the pre-heated blocks are immersed in hot water at around $90°-95°$ C., and a second controlled expansion stage during which they are immersed in hot water at $95°-100°$ C. to undergo expansion to their final dimensions, these preheating and controlled expansion stages being limited in the three dimensions of the block by the walls of a closed frame in which the blocks are enclosed.

However, existing apparatus do not allow this improved process to be carried out except under very poor conditions, since they require a large number of manipulations and consequently the intervention of a considerable work force. Furthermore, this large number of manipulations has to be carried out in an atmosphere saturated with water vapor and therefore very unhealthy, so that the work force employed would be subjected to extremely unpleasant working conditions: in fact, the use of existing apparatus for carrying out the improved process involves the insertion of the embryonic blocks in the above-mentioned appliances, formed by a plurality of superimposed plates, the immersion of these appliances in vats of hot water for specific periods of time, after which the appliances are withdrawn from the vats, the pre-expanded blocks are taken out of the plates so that they can be subjected to a dimension check in order to remove blocks which are insufficiently foamed or are defective, then they are placed in molds with dimensions which are very close to those required for the final product; after such molds have been closed, they are, in turn, immersed in a vat of hot water for a specific period of time to allow the final expansion of the blocks to take place, controlled by the dimensions of the sealed molds, which are then immersed in vats of cold water to effect the dimensional stabilization of the sheets which have been expanded to their final dimensions, and then taken out of the vats of cold water and opened to allow the finished blocks to be recovered.

The existing apparatus does not allow the block expansion operation to proceed until the exact dimensions sought have been obtained, in a plate appliance and/or a single frame appliance, since if it is attempted to carry out the expansion of the embryonic block obtained during the preliminary molding operation on a plate or in a frame which has the final dimensions sought, the finished blocks have irregular dimensions and qualities:

in fact, the dimensions of the embryonic blocks are substantially less than the dimensions of the plate which supports them or of the closed frame in which they are enclosed, which correspond with the final dimensions required for the expanded block, and with the existing apparatus it is not possible to prevent a possible displacement of the embryonic block on the plate or in the frame during the expansion operation in water, which displacement would have an effect on the dimensional expansion of the block and would therefore give rise to finished blocks with irregular dimensions and qualities.

SUMMARY OF INVENTION

The aim of the present invention is therefore to provide production apparatus and in particular apparatus for the expansion of rigid cellular materials comprising polyvinyl chloride, which is better suited to the requirements of industry than the apparatus previously known for the same purpose, especially in that it will enable the numer of manipulations required for the production of the cellular materials and the equipment necessary for carrying out the expansion cycle to be reduced to a considerable extent, and in that it allows a high degree of mechanization and automation of the production operations, resulting therefore in a marked reduction in the work force required and appreciably improving the working conditions.

The present invention relates to apparatus for the expansion of embryonic blocks comprising water-reactive polyisocyanate-containing polyvinyl chloride, previously molded under pressure and at a high temperature, characterized in that it comprises a plurality of superimposed plates, the length and the width of which are substantially identical to those desired for the finished product, each of which plates is associated with a frame attached to the lower face of each plate, this frame co-acting with the plate situated immediately below to form, in use, a water-enterable but otherwise closed expansion box of selected fixed internal dimensions, in that each of the expansion boxes is equipped with means for centering and holding the embryonic block in position on the plate on which it is placed, and in that means are advantageously provided cooperating with the plates to effect the axial displacement of the latter in relation to one another, to move them away from and up to each other for the respective purposes of opening and closing the expansion box, so that, after the embryonic block has been put in place, it is possible for the whole of the expansion process to be carried out and for the finished expanded block to be taken out of the box once the controlled expansion operation has been carried out.

According to an advantageous construction form of the apparatus to which the invention relates, the frame fixed on the lower face of each of the plates comprises a taper oriented downwards, which causes the block so slide out automatically when the expansion box formed by the frame and the adjacent superimposed plates are opened.

According to the invention, the frame comprises a taper which is orientated downwards at an angle in the order of 4° to 8° relative to the vertical plane.

According to another advantageous construction form of the apparatus which is the subject of the invention, the frame is attached to the lower face of each of the plates by means of a slide system.

Again, according to another advantageous construction form of the apparatus to which the invention relates, the frame is associated with means with which it is possible to vary the internal volume of the frames.

According to advantageous apparatus with this construction form, the frame is associated with shims which make it possible to increase the internal vertical dimension of the frame and consequently the thickness of the expanded blocks made in the apparatus according to the invention.

According to another advantageous arrangement of this construction form, the shims are mounted on the upper face of the plate which supports the embryonic block to be expanded, and which co-acts with the frame carried by the lower face of the plate immediately above.

Again, according to another advantageous arrangement of this construction form, the frame is associated with means for reducing the internal volume of the frame, preferably formed by an empty mold incorporated in the frame.

According to the invention, the expansion box is equipped with means for centering and holding the embryonic block in place in the expansion box, characterized in that they are designed to be in contact at least with the upper face of the embryonic block to be expanded, throughout the whole of the expansion process, and in that they are axially movable and in that due to their mobility they are able to move axially in the expansion box, in contact with the embryonic block as the latter expands.

The arrangement of these centering means associated with the expansion box according to the present invention ensures the centering and the locking of the embryonic block in the axis of the expansion box, and their mobility allows them to follow the expansion of the embryonic block, thus allowing all the successive preheating and controlled expansion processes, and also the stabilization of the expanded blocks, to be carried out in a single appliance.

According to a preferred construction form of the invention, each of the means for centering and holding the embryonic block in place in the expansion box is formed by a resilient flexible plate of sheet metal mounted so that it can slide in the above-mentioned frame, and comprising a stop at its lateral edges, being longer than the external length of the frame, its length being sufficient to create a sagged portion when the said plate of sheet metal is put in place, which sagged portion rests on the upper face of the embryonic block, thus ensuring that it is centered and held, and preventing it from rising when the expansion boxes are plunged into the water, the progressive inflation of the embryonic block during the expansion process causing the sagged portion to be lifted up into a flat rectilinear position resting on the upper face of the expanded block as this arrives, after expansion, near to the lower face of the plate immediately above which bears the frame which co-acts with the plate which supports the expanded block.

According to an advantageous arrangement of this construction form, the sheet metal for centering and holding the embryonic block in position in the expansion box is provided with means for controlling the sagged portion.

Advantageously, these means for controlling the sagged portion of the sheet metal may be formed by a regulating screw which is associated with the expansion box by any appropriate means, and particularly by means of a piece of angle iron attached, by welding, for instance, to the frame of each expansion box.

According to the present invention, to allow the metal plate for centering and locating as described above to slide, the lateral walls of the frame have a thickness which is less than that of the longitudinal walls of the latter.

According to another preferred construction form of means for centering and holding the embryonic block in place in an expansion box, they are formed by a rigid plate of sheet metal arranged in contact with the upper face of the embryonic block, attached to rods mounted parallel to the axis of the expansion box in apertures formed in the upper superimposed plate, in which the rods move in the axial direction as the sheet metal plate rises due to the inflation of the block during the expansion process.

Again, according to another preferred construction form of the means for centering and holding an embryonic block in place in an expansion box, they are formed by a rigid plate of sheet metal arranged in contact with the upper face of the embryonic block and associated with the upper superimposed plate by means of compression springs which are compressed in an appropriate housing formed in the plate as the above-mentioned plate rises up due to the expansion of the thickness of the embryonic block.

According to another construction form of the means for centering and holding an embryonic block in place in an expansion box, these are formed by the contouring of the frame and of the plate in such a way as to give them configurations which co-act by fitting into each other and between which a recess is formed with dimensions which make it possible for it to hold an embryonic block which is to be expanded, the frame or the plate also being associated with displacement means which allow it to move in the axial direction as the block is inflated during the expansion process, following a path which is limited precisely to the final thickness required for the expanded blocks.

As stated above, the apparatus for controlled expansion according to the present invention comprises a plurality of superimposed plates for the simultaneous processing of a plurality of embryonic blocks, this plurality of plates being connected at its base and at the top respectively to a rigid metal part called a "bed", to form an assembly known as a "basket" which forms a coherent unit which can be transferred, in turn, into a succession of baths containing water held at the respective temperatures specified above, in which the controlled expansion and stabilization operations are carried out on the blocks.

According to the invention, the plates can be displaced axially in order to open and close them by any suitable means inside the basket defined by the upper and lower beds mentioned above.

According to an advantageous construction form of the means for opening and closing the plates to allow their axial displacement, these comprise at least one rod or the like associated with the lower and upper beds or with one of these, and a pulley or the like which is in co-acting relationship with the upper bed of the basket.

According to the invention, the closing of a basket is effected by the connecting of the rod or rods with at least one of the beds, while the opening of the basket is effected by disconnecting the rod or rods from the basket, thus freeing the plates which are installed between the lower and upper beds in order to displace them axially to open the expansion boxes with the aid of the pulley or the like mentioned above, to allow either the removal of the finished expanded blocks or the introduction of embryonic blocks which are to be expanded in the plurality of expansion boxes which form a basket.

According to the invention, the axial displacement for opening and closing a controlled expansion box formed by two adjacent plates and by the frame associated with the lower face of the upper plate is moreover limited by mounting on two adjacent plates a small rod which has near to one of its ends an eccentric oblong slot, within the confines of a pin, carried by the plate which is moved axially, travels, thus limiting the axial displacement of the plate relative to the adjacent plate, to which the other end of the small rod is attached.

Also according to the invention, the transference of a basket from one controlled expansion bath to the following bath and to the stabilization bath or baths is carried out with the aid of a rolling hoist which transfers each basket of a set of baskets from one bath to the other in succession.

The immersion of a basket in the bath to which it is brought up at right angles by the rolling hoist, as well as its removal from the bath, are advantageously carried out according to the invention with the aid of the above-mentioned pulley which may advantageously be mounted integral with the said hoist for this purpose.

The transfer of the baskets of a set in succession from one treatment bath to another with the aid of a hoist or the like, which involves a horizontal displacement movement associated with a descending and ascending movement respectively, carried out by the pulley or the like mentioned above, to immerse the baskets in a bath and to remove them from it, makes it possible to carry out all the steps of the controlled expansion process of a set of embryonic blocks contained in the basket concerned without opening the expansion boxes, and this opening only occurs when the embryonic blocks which are to be expanded are being loaded and when the finished expanded blocks are unloaded.

According to the invention, the commands for the displacement of the rolling hoist or the like to transfer the baskets from one bath to another, and the command for the vertical lowering or raising displacement of the pulley or the like to immerse the baskets in the bath concerned and to remove them from this bath may be carried out manually by an operator.

Also according to the invention, the command for the displacement of the rolling hoist or the like and the command for the displacement of the pulley may be effected with the aid of a remote control system which is known per se.

According to a particularly advantageous construction form of the plant according to the present invention, the command of the displacement of the rolling hoist or the like and the command for the displacement of the pulley are automated with the aid of a programming system, known per se, associated with the remote control system.

Besides the preceding arrangements, the invention also comprises other arrangements, which will become apparent from the following detailed description of specific embodiments.

The present invention relates in particular to the processes and production apparatus for rigid cellular materials comprising polyvinyl chloride, according to the arrangements described above, as well as to means which are suitable for carrying out these processes and for the construction of these arrangements, and the production lines in which such processes and/or apparatus are included.

BRIEF DESCRIPTION OF DRAWING

The invention will be better understood with the aid of the description which follows, with reference to the attached drawings.

FIG. 1 is a plan view of a frame according to the present invention.

FIG. 2 is a section along II—II in FIG. 1, showing the frame according to the present invention.

FIG. 3 is a section through an expansion box according to the present invention, equipped with means for reducing its internal volume.

FIGS. 4a and 4b show a section through an expansion box according to the invention, equipped with shims, either open or closed respectively.

FIGS. 5a to 7b are schematic sections showing different construction forms of the means for centering and holding a block of cellular material in place in an expansion box according to the invention.

FIG. 5c is a partial schematic view on a larger scale of a construction form of the means for centering and holding a block in place, as in FIGS. 5a and 5b, showing, by way of non-limitative example, a construction form for the means for controlling the sagged portion of the said means for centering and holding.

FIG. 8 is a front view of an appliance according to the present invention, showing schematically the means which carry out the horizontal displacement of the said appliance from one treatment bath to another, the means for vertical displacement for the immersion of the said appliance into a bath and its removal therefrom, and means for limiting the relative axial displacement between the plates included in the said appliance.

FIG. 9 is a side view of the appliance shown in FIG. 8.

It should be understood, however, that these drawings and the corresponding sections of the description are given purely as an illustration of the subject of the invention, and in no way form a restriction.

DETAILED DESCRIPTION OF EMBODIMENTS

The apparatus which is the subject of the present invention, for the expansion of rigid cellular materials comprising polyvinyl chloride, comprises a plurality of plates 1, 1', 1'',1''', etc. (see FIGS. 8 and 9), which have a substantially planar upper face 2 and a lower face 3 (see FIG. 4a). With the exception of the plate 1 which is located at the bottom of the apparatus, each plate bears on its lower face a frame 4, preferably made of steel sheet or any other suitable material, attached to the plate 1', 1'', 1''', etc. Although the frame 4 may be attached to the face 3 of the plate permanently, by screws or by welding (see FIGS. 2 and 3), for example, it is advantageous for it to be attached by a system of slides 5 (see FIGS. 4a and 4b) which affords the advantage that the frame can be removed for maintenance or replacement in the case of wear or important changes in the dimensions for the production of the cellular material blocks.

The frame 4 preferably has a slight taper 6 in the order of 4° to 8°, orientated downwards.

It is also advantageous in certain cases for the longitudinal walls 7 of the frame 4 to be thicker than the lateral walls 8; it may be advantageous, for example, for the thickness of the longitudinal walls 7 of the frame to be greater by 20/10 than the thickness of the lateral walls 8, for reasons which will be explained in greater detail later.

The upper face 2 of the plate 1 is advantageously provided with centering holes 9 (see FIG. 4a) intended to hold removable shims 10 which co-act, when necessary, with the frame 1, as described below. The shims 10 are preferably, but not essentially, made of profiled steel sheet.

The expansion of an embryonic plastic block 11 is carried out in the expansion box formed by the lower plate 1 which bears the block 11, the upper plate 1', the frame 4 and possibly the shims 10, by bringing the two plates 1 and 1' together so that they form with the frame 4—and possibly the shims 10—a closed box of fixed predetermined dimensions, the internal volume of which corresponds to the final dimensions of the expanded block 12.

The arrangement of shims on the lower plate 1 opposite the frame 4 attached to the lower face 3 of the upper plate 1', makes it possible to vary the height of the expansion box according to the invention and to obtain therefore, with the same frame, expanded blocks of various thicknesses. Thus, for example, by attaching to the lower face 3 of the plate 1' a frame which is 34 mm deep, it is possible to obtain expanded blocks which are 34 mm deep. With the same frame, and by attaching 10 mm high shims 10 in the centering holes 9 formed on the upper face 2 of the plate 1, expanded blocks which are 44 mm deep are obtained. Shims 20 mm high allow, in the same way, expanded blocks which are 54 mm high to be obtained, and 30 mm high shims allow expanded blocks with a thickness of 64 mm to be obtained.

By attaching to the lower face 3 of the plate 1' a frame which is 64 mm deep, it is possible to obtain expanded blocks which are 64 mm deep, and by making such a frame co-act respectively with 10 mm, 20 mm, 30 mm and 40 mm high shims, expanded blocks which are 74 mm, 84 mm, 94 mm and 104 mm deep would be obtained.

In this way, with two kinds of frame, for example, co-acting as required with appropriate shims, it is possible to obtain a large number of different thicknesses for the blocks, it being understood that the dimensions given above only constitute non-limiting examples.

In a similar way, it is possible to reduce the internal volume of the frames in width and/or in length by incorporating in them empty molds 33, made of sheet metal, for instance, on which the expanded blocks come to rest in the finished state, as shown in FIG. 3.

Thus, by carefully combining with the frames according to the invention appropriate shims and molds for reducing the length and/or the width of the frames, it is possible to obtain within relatively wide limits predetermined three dimensions of the finished expanded blocks in relation to each other, on the basis of a small number of types of frame, which compared with the prior art represents a considerable economic advantage.

In addition, attaching the frame to the plate and the taper which the frame comprises eliminate the necessity for any handling of the frame to remove the finished expanded block as the frame attached to the plate no longer requires handling, which gives rise to deterioration and accidents, and the taper allows the block to slide automatically when the expansion box is opened.

According to the invention, the embryonic block 11 is centered on the axis of the box 1-1'-4 (and possibly 10 and/or 33) and is held in place in the latter with the aid of appropriate means which are suitable for being displaced while resting on the embryonic block as the latter expands to hold the block centered throughout the expansion operation, without in any way prejudicing the development of this process.

In the construction form shown by way of example in FIGS. 5a and 5b, these centering means are formed by a resilient and flexible plate of sheet metal 13, the length of which is substantially greater than the external length of the frame 4. The sheet metal 13 is bent back at its two ends to form the stops 14.

The lesser thickness of the lateral walls 8 of the frame 4 compared with the longitudinal walls thereof, enables the plate 13 to be put in place between the lower face 3 of the plate 1' and the frame 4, in such a way as to permit the plate 13 to slide laterally.

Due to its flexibility, the plate 13 forms a sagged portion 15 which is limited by the stops 14, which is calculated to rest on the upper face of the embryonic block 11 when the latter is put in place on the face 2 of the plate 1, without making the introduction of the block 11 difficult, and to assume, by sliding, a rectilinear flat position, parallel to the lower face of the plate 1', resting between the upper face of the expanded block 12 and the lower face 3 when the block 12 has completed its expansion.

It may be considered advantageous to arrange means for controlling the sagged portion 15 to ensure as perfect a homogeneity as possible for the dimensions, and particularly for the thickness of the blocks expanded in the expansion boxes according to the present invention. This is the reason why the expansion boxes according to the invention may be provided with means for controlling the sagged portion 15, intended either to even out any possible variations in the latter, and/or to control it in combination with the addition of shims in the expansion boxes. Such control means may be formed, for example, as illustrated in FIG. 5c, but not in a limitative way, by regulating screws 34 screwed into angle iron parts 35 attached, for example, by spot welding, on the frame 4, and which act by pressing on or releasing, according to need, the edges of the plate 13 in order to raise or lower the sagged portion 15 of the latter, if required. It has been found that for dimensions of expanded blocks indicated above, the sagged portion 15 should vary between a minium of 54 mm and a maximum of 70 mm: the arrangement of the control means such as the screw 34 make it possible to regulate the sagged portion in conjunction with an expansion box with given dimensions to correct any possible variation in the sagged portion compared with the required figures, and also to adapt the sagged portion to a change in the dimensions of a given expansion box as a result of inserting shims and/or molds for reducing its volume.

In the construction form of the centering means shown by way of example in FIGS. 6a and 6b, the centering means are formed by a rigid sheet metal plate 16 attached to one end of springs 17 with a compression effect, the other end of which is fixed in a recess 18 formed in the lower face 3 of the plate 1'. The plate 16 is mounted in such a way that it comes to rest on the upper face of the embryonic block 11 which gradually pushes it back as its expansion progresses until it comes into contact with the face 3 of the plate 1' being returned by the springs 17.

In the construction form of the centering means shown by way of example in FIGS. 7a and 7b, the lower plate 19 has a taper 20 which allows the plate 1 and the frame 4 to partly fit over the lower plate 19, while defining a space 22 which is suitable for holding an embryonic block 11 to be expanded between the lower face 3 of the plate 1' and the upper face 21 of the plate 19. Under the effect of the expansion of the block 11 one of these two plates is caused to move axially relative to the other, its path being strictly limited, however, by mechanical means such as stops 40 or small rods for example so that their relative spacing cannot exceed the final thickness which is required for the block 12 which has been expanded.

The embryonic blocks 11 are obtained by molding under pressure and at a high temperature in a way which is known per se and which is the following, for instance: following products are thoroughly mixed in a Werner mixer:

| | |
|---|---|
| Dutrex VIO | 0,400 kg |
| Desmodur T (isocyanate) | 1,450 kg |
| Azoisodibutyric dinitrile (blowing agent) | 0,120 kg |
| Phthalic anhydride | 1,680 kg |
| Calcium carbonate | 0,280 kg |
| Polyvinyl chloride | 4,100 kg | when a smooth paste has been obtained said paste is placed into molds which are brought to 175° C. under a pressure of 150 kg/cm$^2$. After cooling, the cellular bodies obtained are removed from the molds and are introduced into the controlled expansion appliance according to the present invention in which they remain during the entire controlled expansion process without requiring any intermediate handling, until the finished expanded blocks with controlled homogeneous dimensions are obtained, thus allowing a continuous process to be put into effect without any interruptions or discontinuity, with a work force which is reduced to the minimum required for the introduction of the embryonic blocks to be processed in the appliance according to the invention, and for the removal of the finished expanded blocks from the appliance.

According to the invention, a plurality of closed expansion boxes each containing a block 11, when assembled together form a basket 36 defined at its base by a rigid lower plate 37 or lower bed, and at the top by an upper rigid plate 38 or upper bed, which is immersed in successive baths to undergo the controlled expansion treatment according to the invention.

More specifically, a basket 36 is immersed successively in a bath of hot water held at a temperature of 80°–85° C., in which the blocks 11 are subjected to pre-heating, then in at least one bath of hot water held at a temperature between 90° and 95° C., and into at least one bath of hot water held at a temperature of between 95° and 100° C., in which baths the blocks 11 are subjected to a controlled expansion process and wherein hot water reacts with the polyisocyanate to form a product which rigidifies the PVC foam, and finally into at least one bath of cold water in which the expanded blocks are subjected to a stabilization process, after which the blocks, expanded to their final dimensions and stabilized, are recovered for use, possibly preceded by finishing and/or machining operations which are normal in this field.

The operation of an appliance according to the present invention in conjunction with a controlled expansion process applied to embryonic blocks made of polyvinyl chloride to obtain rigid cellular materials, will be described in greater detail in the following, by way of non-limitative example.

An embryonic block 11 is placed on the upper face 2 of each of the plates 1, 1', 1'', 1''', etc. of a basket 36, after the expansion boxes have been opened. To open the expansion boxes which together form the basket 36 in order to introduce the embryonic blocks 11, the following procedure is followed: When the basket 36 is in the closed position, the rod 23 is held by its upper end in a bracket 24 which is connected to the pulley 39 which is itself effectively connected with the upper bed 38 of the basket 36; the rod 23 is held in the bracket 24 by the locking pin 29. The lower end of the rod 23 is pivotably mounted in a pivot axis 30 connected to the lower bed 37 of the basket 36.

To open the expansion boxes, the upper end of the rod 23 is disconnected from the bracket 24 by unlocking the pin 29 which makes it possible to pivot the lower end of the rod 23 around the axis 30, and to free the plates 1, 1', 1'', 1''', etc. The actuation of the pulley 39, carried out in a brief and intermittent fashion, causes a plate to be raised, or perhaps several plates at one time, in the axial direction relative to the plate which is immediately below it, in order to bring the said plate or plates on level with a man and also to provide sufficient axial spacing between two adjacent plates to allow the manual—or perhaps mechanical—introduction of an embryonic block 11 on the upper face 2 of a lower plate, 1 for example, of each expansion box.

The path of the axial displacement of the upper plate, 1' for instance, of the expansion box, relative to the lower plate is limited by the arrangement of a small rod 25, attached by its lower end, for example by means of the axis 26, to the lower plate of each expansion box, this small rod comprising at its upper end an oblong slot 27 in which a pin 28 attached to the upper plate of each expansion box is displaced, its path being limited by the length of the large axis of the said oblong slot 27.

Once the expansion boxes of a basket 36 are charged with embryonic blocks 11, they are closed again by the axial displacement of the upper plate of each expansion box to bring it up to the lower plate, by the intermittent action of the pulley. When all the expansion boxes have been loaded and closed, the basket is closed by putting in place the upper end of the rod 23 in the bracket 24 and locking the pin 29, and then the closed basket is brought by means of a travelling hoist (not shown) which is known per se, straight to a vat (not shown) containing a bath of hot water held at a temperature in the order of 80°-85° C. The basket is then lowered by the pulley 29 into the vat where it remains for an appropriate time, for example, 30 minutes, during which the embryonic blocks enclosed in the expansion boxes according to the invention are subjected to pre-heating to ensure homogenization of the temperature inside each block, and preexpansion. At the end of the desired time the pully 29 lifts the basket 36 again to remove it from the vat and the travelling hoist takes it straight to another vat (not shown) containing a bath of hot water held at a temperature in the order of 90°-95° C., in which it is lowered by the pulley 29 so that it is immersed in the bath for an appropriate period of time, such as 2 hours, for example, during which time the blocks undergo a controlled expansion process in the expansion boxes in which they are enclosed. At the end of the prescribed time, a repeated operation carried out by the pulley 29 to lift the basket, and a new transfer operation carried out by the travelling hoist brings the basket, still closed, straight up to a new vat (not shown) containing a bath of hot water held at a temperature in the order of 95°-100° C., in which it is lowered by the pulley 29 to be immersed there for an appropriate period of time, such as 4 hours, for example, during which time the controlled expansion process of the blocks is brought to completion and the finished blocks undergo a hardening process due to the water/polyisocyanate reaction. A new lifting operating by the pulley 29 and a new transfer operation by the travelling hoist brings the basket 36, still closed, straight up to a vat (not shown) containing a bath of cold water, in which it is immersed for an appropriate time, such as 30 minutes, for example, to bring about the stabilization of the expanded blocks.

Once the basket 36 has been removed from the stabilization vat by the pulley 29, it is opened, and the expansion boxes are opened successively as described above, to remove the finished expanded blocks from the latter, and to replace them with a new set of embryonic blocks 11 to be treated during a new cycle.

A complete expansion cycle has been described above. However, it will be readily appreciated that the expansion process may comprise successive immersions of the same basket in several baths at the same temperature, depending on the final qualities which the finished product is required to have. In the same way, one or other of the immersion stages indicated above may be omitted, thus allowing the quality of the final product obtained, and particularly its density, to be varied within wide limits. It will also be readily understood that according to the specific controlled expansion process to which it is desired to subject the embryonic blocks, the expansion of these may be effected by immersing them successively in baths with different temperatures than those specified above.

The apparatus according to the invention allows better use to be made of the series of vats containing the expansion baths, bearing in mind the fact that the high level of mechanization of the expansion cycle and its automation allows all the vats in the series to be used simultaneously for the simultaneous treatment in each vat of baskets with contents at different stages of the expansion cycle.

The operation of the apparatus according to the invention may be improved by mounting a plurality of such appliances in a round-about formation, using a common hoist, which allows rationalization of the use of the baths and a reduction in the bulk of the appliances.

It should be emphasized that it is the co-action between two adjacent plates via a frame with a taper attached to the lower face of the upper plate, and the co-action of the said frame with the means for centering and holding an embryonic block in place, according to the invention, which make it possible to carry out all the expansion and stabilization cycle in one single appliance, and which allows therefore the automation of the expansion and stabilization operations of blocks made of rigid cellular materials.

It will be clear from the preceding description that, whatever may be the method of putting them into effect, the construction form and the application adopted, processes and apparatus are obtained for the production of rigid cellular materials comprising polyvinyl chloride which, compared with the processes and apparatus designed for the same purpose which were previously known, present numerous advantages, some of which have been mentioned above, and to which the following advantages should be added, being listed as a non-limiting indication:

With the appliances according to the invention it is possible to carry out an expansion of the blocks in three dimensions, to produce blocks with regular dimensions and correct shapes, and giving greater regularity in the production of blocks made of rigid cellular materials. It allows the duration of the production cycles to be reduced due to the reduction in the number of handling operations. Important energy savings are possible due to the immersion of a single appliance in the different baths of hot water, instead of having to immerse successive different appliances which requires the temperature to be raised each time to the previous temperature. The apparatus according to the invention enables the production cycles to be automated, and as such automation is in addition to the reduction in handling operations, this means a considerable reduction in the work force required for the production of rigid cellular materials. Furthermore, due to the fact that the apparatus according to the invention considerably improves the regularity of production and makes it possible to obtain blocks conforming accurately with the desired dimensions, a very considerable reduction in the number of rejects produced is achieved. The apparatus according to the invention eliminates all handling of the frames and ensures precisely the correct positioning of the blocks to be expanded, thus making production very much easier, and allowing the removal of the expanded blocks from the molds to be mechanized and the production cycles to be automated, due to the fact that these are carried out in a single appliance and it is no longer necessary to transfer the blocks into different appliances corresponding to each of the phases of the production cycle.

As will be appreciated from the above, the invention is in no way limited to those methods of putting it into effect, of construction and of application which have been described above in detail; on the contrary, it covers all versions which may be conceived of by workers skilled in the art, without exceeding either the framework or the scope of the present invention.

What is claimed is:

1. In a process for producing rigid cellular plastic by treatment of an embryonic block of PVC containing a polyisocyanate, with a hot fluid comprising water selected from the group consisting of liquid water and water vapor, the improvement comprising:
   introducing said embryonic block into a closable expansion box into which the hot fluid can pass and having side walls, a bottom wall and a top wall, and further containing a centering and holding means for the embryonic block, said expansion box being of predetermined, fixed internal maximum dimensions, closing said expansion box and centering and holding said embryonic block in place with said centering and holding means;
   introducing said closed box containing said embryonic block into a first bath of said hot fluid at a temperature of about 80°-85° C. for a sufficiently long period to pre-heat said embryonic block to a uniform temperature;
   removing said closed expansion box from said first bath and immersing it into a second bath of said hot fluid at a temperature of about 90°-95° C. for a period sufficient to cause pre-expansion of said block;
   removing said expansion box from said second bath and immersing it into a third bath of said hot fluid held at a temperature of about 95°-100° C. for a period sufficiently long to bring about expansion of said block to the internal dimensions of said expansion box and also to bring about hardening of said expanded block by reaction between said water and said polyisocyanate, the expansion of said block being performed in said closed expansion box and being controlled by means of said centering and holding means and without transferring of said block from one expansion box to another; and
   cooling said expansion box containing said expanded block for a period sufficiently long to dimensionally stabilize said expanded block.

2. A process according to claim 1, wherein said hot fluid is liquid water.

3. A process according to claim 1, wherein said closed box is immersed into at least one additional bath of said hot fluid at a temperature approximately the same as the hot fluid bath of the immediately preceding step.

4. Apparatus for the expansion of embryonic blocks comprising polyvinyl chloride to obtain uniform cellular PVC of predetermined dimensions, obtained by molding under pressure and at a high temperature, comprising
   means to heat the blocks using hot water or steam, a plurality of superimposed plates each of which is associated with a frame attached to the lower face of each plate, this frame co-acting with the plate situated immediately below to form, in use, a closed expansion box, the internal dimensions of which correspond to the predetermined dimensions of the cellular product, wherein each expansion box is further equipped with means for centering and holding the embryonic block in position on the plate on which it is placed, and means are advantageously provided for co-operating with the plates to effect relative axial displacement thereof for the purposes of opening and closing the expansion box, so that, after the embryonic block has been put in place, it is possible for the whole of the expansion process to be carried out and for the finished expanded block to be taken out of the box after the controlled expansion operation has been completed.

5. Apparatus according to claim 4, characterized in that the frame attached to the lower face of each of the plates comprises a taper orientated downwards, which causes the block to slide out automatically when the expansion box formed by the frame and the adjacent superimposed plates is opened.

6. Apparatus according to claim 5, characterized in that the frame comprises a taper orientated downwards at an angle in the order of 4°-8° relative to the vertical plane.

7. Apparatus according to claim 4, characterized in that the frame is attached to the lower face of each of the plates by means of a slide system.

8. Apparatus according to claim 4, characterized in that the lateral walls of the frame are not as thick as the longitudinal walls thereof.

9. Apparatus according to claim 4, characterized in that the frame is associated with means with which it is possible to vary the internal volume of the frames.

10. Apparatus according to claim 9, characterized in that the frame is associated with shims which make it possible to increase the internal vertical dimension of the frame and consequently the thickness of the expanded blocks made in the apparatus according to the invention.

11. Apparatus according to claim 10, characterized in that the shims are mounted on the upper face of the plate which supports the embryonic block to be expanded, and which co-acts with the frame carried on the lower face of the plate immediately above.

12. Apparatus according to claim 9, characterized in that the frame is associated with means for reducing the internal volume of the frame, preferably formed by an empty mold incorporated in the frame.

13. Apparatus according to claim 4, characterized in that the expansion box is equipped with said means for centering and holding the embryonic block in place in the expansion box, designed to be in contact at least with the upper face of the embryonic block to be expanded throughout the whole of the expansion process, being axially movable and, due to their mobility, able to move axially in the expansion box, in contact with the embryonic block as the latter expands.

14. Apparatus according to claim 13, characterized in that each of the means for centering and holding the embryonic block in place in the expansion box is formed by a resilient flexible plate of sheet metal mounted so that it can slide in the above-mentioned frame, and comprising a stop at its lateral edges, being longer than the external length of the frame, its length being sufficient to create a sagged center portion thereof when the said plate of sheet metal is put in place, which sagged portion rests on the upper face of the embryonic block, thus ensuring that it is centered and held, and preventing it from rising when the expansion boxes are plunged into the water, the progressive inflation of the said embryonic block during the expansion process causing the sagged portion to be lifted up into a flat rectilinear position resting on the upper face of the expanded block as this arrives, after expansion, near to the lower face of the plate immediately above which bears the frame which co-acts with the plate which supports the expanded block.

15. Apparatus according to claim 14, characterized in that the sheet metal for centering and holding the embryonic block in position in the expansion box is provided with means for controlling the sagged portion.

16. Apparatus according to claim 15, characterized in that the means for controlling the sagged portion of the sheet metal are advantageously formed by a regulating screw associated with the expansion box and with the above-mentioned sheet metal.

17. Apparatus according to claim 13, characterized in that the means for centering and holding an embryonic block in place in an expansion box are formed by a rigid plate of sheet metal arranged in contact with the upper face of the embryonic block, attached to rods mounted parallel to the axis of the expansion box in apertures formed in the upper superimposed plate, in which the said rods move in the axial direction as the sheet metal plate rises due to the inflation of the block during the expansion process.

18. Apparatus according to claim 13, characterized in that the means for centering and holding an embryonic block in place in an expansion box are formed by a rigid plate of sheet metal arranged in contact with the upper face of the embryonic block, associated with the upper superimposed plate by means of compression springs which are compressed in an appropriate recess formed in the said plate as the above-mentioned plate rises up due to the expansion of the thickness of the embryonic block.

19. Apparatus according to claim 4, characterized in that it comprises a plurality of superimposed plates for the simultaneous processing of a plurality of embryonic blocks, this plurality of plates being connected at its base and at the top respectively to a rigid metal part called a "bed", to form an essembly known as a "basket" which forms a coherent unit which can be transferred in turn into a succession of baths containing water held at appropriate temperatures, in which the blocks undergo the controlled expansion and stabilization operations.

20. Apparatus according to claim 19, characterized in that the plates can be displaced axially in order to open and close them by any suitable means inside the basket defined by the lower and upper beds mentioned above.

21. Apparatus according to claim 20, characterized in that the said means for opening and closing the plates to allow their axial displacement comprise at least one rod or the like associated with the said lower and upper beds or with one of these, and a pulley or the like which is effectively connected to the upper bed of the basket.

22. Apparatus according to claim 21, characterized in that the closing of a basket is effected by the connecting of the said rod or rods with at least one of the beds, while opening of the said basket is effected by disconnecting the said rod or rods from the basket, thus freeing the plates which are installed between the lower and upper beds in order to displace them axially to open the expansion boxes with the aid of the pulley or the like mentioned above, to allow either the removal of the finished expanded blocks or the introduction of embryonic blocks which are to be expanded in the plurality of expansion boxes which form a basket.

23. Apparatus according to claim 4, characterized in that the axial displacement for opening and closing a controlled expansion box formed by two adjacent plates and by the frame associated with the lower face of the upper plate is moreover limited by mounting on two adjacent plates a small rod which has near to one of its ends an eccentric oblong slot, within the confines of which a pin carried by the plate which is carrying out an axial movement is displaced, thus limiting the axial displacement of the said plate relative to the adjacent plate, to which the other end of the small rod is attached.

24. Apparatus according to claim 19, characterized in that the transference of a basket from one controlled expansion bath to the following bath and to the stabilization bath or baths is carried out with the aid of a travelling hoist or the like which transfers each basket of a set of baskets from one bath to the other in succession.

25. Apparatus according to claim 19, characterized in that the immersion of a basket in the bath to which it is brought by the travelling hoist or the like, as well as its removal from the said bath, are advantageously carried out according to the invention, with the aid of the above-mentioned pulley which may advantageously be mounted integral with the said travelling hoist for this purpose.

26. Apparatus for the expansion of an embryonic block of a foamable plastic material containing a component reactable with water to rigidify the resultant foam, to obtain a uniform cellular plastic of predetermined dimensions, and obtained by molding said embryonic block under pressure and at a high temperature, said apparatus comprising:

means to bring hot water or hot water vapor directly into contact with the plastic block, and wherein hot water or hot water vapor are maintained in three separate zones at three temperatures ranging respectively from about 80°–85° C., 90°–95° C., and 95°–100° C.;

a plurality of superimposed plates each of which is associated with a frame attached to the lower face thereof, said frame co-acting with a plate situated immediately therebelow to form, in use, a closed expansion box, the maximum internal dimensions of which correspond to the predetermined dimensions of the cellular product desired to be produced;

means for centering and holding the embryonic block in position on the plate on which it is placed, said means for centering and holding being adapted to move with the embryonic block as it expands, but said apparatus having means which prevents the block from expanding to a size greater than the predetermined dimensions of said expansion box;

means for co-operating with said plates to effect relative axial displacement thereof for the opening and closing of said expansion box; and means to move said plurality of superimposed plates sequentially through each of the three zones containing hot water or hot water vapor.

27. Apparatus according to claim 26, wherein said means for centering and holding the embryonic block comprises a metallic plate disposed immediately below the upper of the two plates which form a closed expansion box, and which centering and holding means is movable within said closed expansion box.

28. Apparatus according to claim 26, wherein said means for centering and holding the embryonic block constitutes the upper of said plates, additional means being provided to prevent said upper plate from moving away from said lower plate beyond said predetermined dimensions.

* * * * *